United States Patent
Kim et al.

(10) Patent No.: US 11,618,837 B2
(45) Date of Patent: Apr. 4, 2023

(54) ADHESIVE FILM, OPTICAL MEMBER INCLUDING SAME, AND OPTICAL DISPLAY DEVICE INCLUDING SAME

(71) Applicants: SAMSUNG SDI CO., LTD., Yongin-si (KR); SAMSUNG ELECTRONICS CO., LTD., Suwon-si (KR)

(72) Inventors: Ji Ho Kim, Suwon-si (KR); Ji Won Kang, Suwon-si (KR); Jin Young Lee, Suwon-si (KR); Jae Hyun Han, Suwon-si (KR); Byeong Do Kwak, Suwon-si (KR); Il Jin Kim, Suwon-si (KR); Sung Hyun Mun, Suwon-si (KR); Gwang Hwan Lee, Suwon-si (KR); Ik Hwan Cho, Suwon-si (KR); In Chui Hwang, Suwon-si (KR)

(73) Assignees: Samsung SDI Co., Ltd., Yongin-si (KR); Samsung Electronics Co., Ltd., Suwon-si (KR)

( * ) Notice: Subject to any disclaimer, the term of this patent is extended or adjusted under 35 U.S.C. 154(b) by 510 days.

(21) Appl. No.: 16/615,770

(22) PCT Filed: May 14, 2018

(86) PCT No.: PCT/KR2018/005503
§ 371 (c)(1),
(2) Date: Nov. 21, 2019

(87) PCT Pub. No.: WO2018/216938
PCT Pub. Date: Nov. 29, 2018

(65) Prior Publication Data
US 2020/0157386 A1   May 21, 2020

(30) Foreign Application Priority Data

May 22, 2017   (KR) .................. 10-2017-0063179

(51) Int. Cl.
| | | |
|---|---|---|
| *C09J 11/08* | (2006.01) | |
| *C09J 7/38* | (2018.01) | |
| *C09J 7/29* | (2018.01) | |
| *C08K 7/22* | (2006.01) | |
| *C08L 33/06* | (2006.01) | |
| *C08L 33/08* | (2006.01) | |
| *C08L 47/00* | (2006.01) | |
| *C09J 4/00* | (2006.01) | |
| *B82Y 30/00* | (2011.01) | |

(52) U.S. Cl.
CPC ............. *C09J 7/385* (2018.01); *C08K 7/22* (2013.01); *C08L 33/066* (2013.01); *C08L 33/08* (2013.01); *C08L 47/00* (2013.01); *C09J 4/00* (2013.01); *C09J 7/29* (2018.01); *C09J 11/08* (2013.01); *B82Y 30/00* (2013.01); *C08K 2201/003* (2013.01); *C08L 2203/16* (2013.01); *C08L 2207/53* (2013.01); *C08L 2312/00* (2013.01); *C09J 2433/00* (2013.01); *Y10T 428/2891* (2015.01)

(58) Field of Classification Search
None
See application file for complete search history.

(56) References Cited

U.S. PATENT DOCUMENTS

| | | | | |
|---|---|---|---|---|
| 2016/0177146 | A1* | 6/2016 | Mun ............... | C09J 133/08 |
| | | | | 428/220 |
| 2020/0347270 | A1* | 11/2020 | Kim ............... | C08L 53/02 |
| 2021/0332273 | A1* | 10/2021 | Mun ............... | C09J 7/10 |

FOREIGN PATENT DOCUMENTS

| | | | | |
|---|---|---|---|---|
| CN | 1324390 | A | 11/2001 | |
| CN | 1693401 | A | 11/2005 | |
| CN | 1820217 | A | 8/2006 | |
| CN | 102101986 | A | 6/2011 | |
| CN | 102408844 | A | 4/2012 | |
| CN | 105567109 | A | 5/2016 | |
| CN | 105567137 | A | 5/2016 | |
| CN | 105713537 | A | 6/2016 | |
| CN | 105713538 | A | 6/2016 | |
| CN | 106318241 | A | 1/2017 | |
| CN | 106349961 | A | 1/2017 | |
| JP | 2011-105858 | A | 6/2011 | |
| JP | 2012-62454 | A | 3/2012 | |
| KR | 10-2006-0033713 | A | 4/2006 | |
| KR | 10-2006-0047584 | A | 5/2006 | |
| KR | 10-2007-0055363 | A | 5/2007 | |
| KR | 10-2008-0052897 | A | 6/2008 | |
| KR | 10-2016-0076974 | A | 7/2016 | |
| KR | 10-2017-0051707 | A | 5/2017 | |
| WO | WO-0024839 | A1 * | 5/2000 | .......... C08F 283/006 |

OTHER PUBLICATIONS

Product information sheet "4-Hydroxybutyl Acrylate" from Mitsubishi Chemical, Apr. 27, 2022 (Year: 2022).*
CN Office action dated Nov. 15, 2021 issued in corresponding CN Application No. 201880033619.9, 7 pages.
Chinese Office Action from corresponding Chinese Patent Application No. 201880033619.9, Chinese Office Action dated Apr. 8, 2021 (11 pgs.).

* cited by examiner

*Primary Examiner* — Anish P Desai
(74) *Attorney, Agent, or Firm* — Lewis Roca Rothgerber Christie LLP

(57) ABSTRACT

Provided are an adhesive film, an optical member including the same, and an optical display device including the same, the adhesive film being formed from a monomer mixture comprising an alkyl group-containing acrylate and a hydroxyl group-containing acrylate, wherein the adhesive film has a modulus of 80 kPa or less at −20° C., and the adhesive film has a value of 40% to 140% in equation 1 at 25° C.

19 Claims, 2 Drawing Sheets

[FIG. 1]
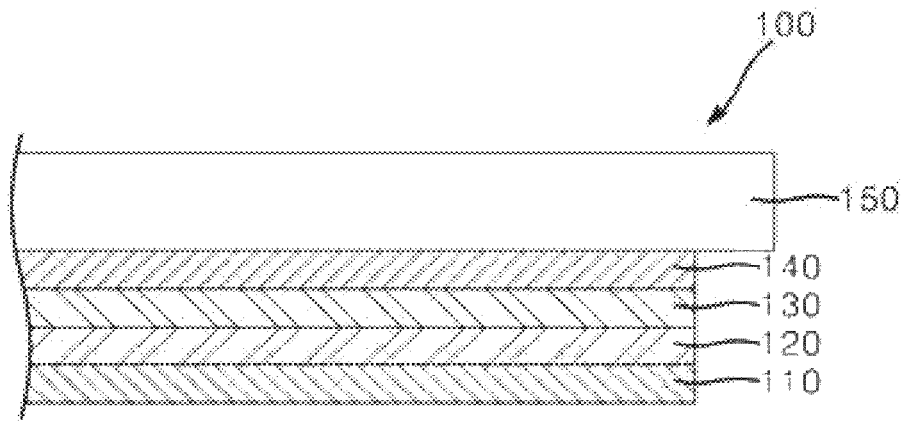
[FIG. 2]
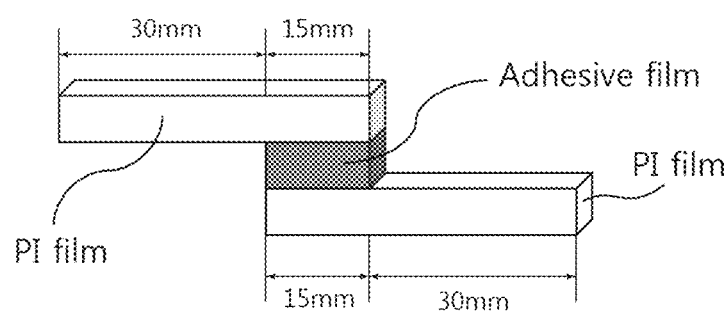
(a)
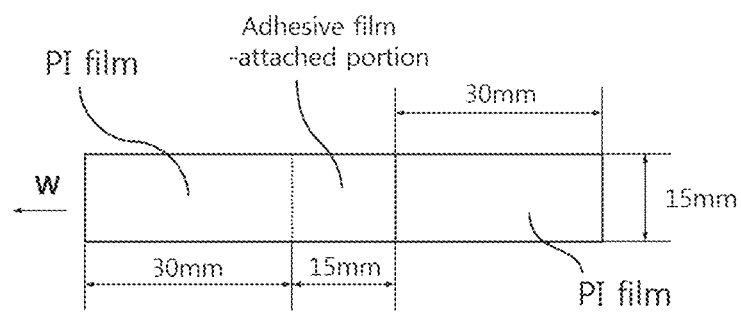
(b)

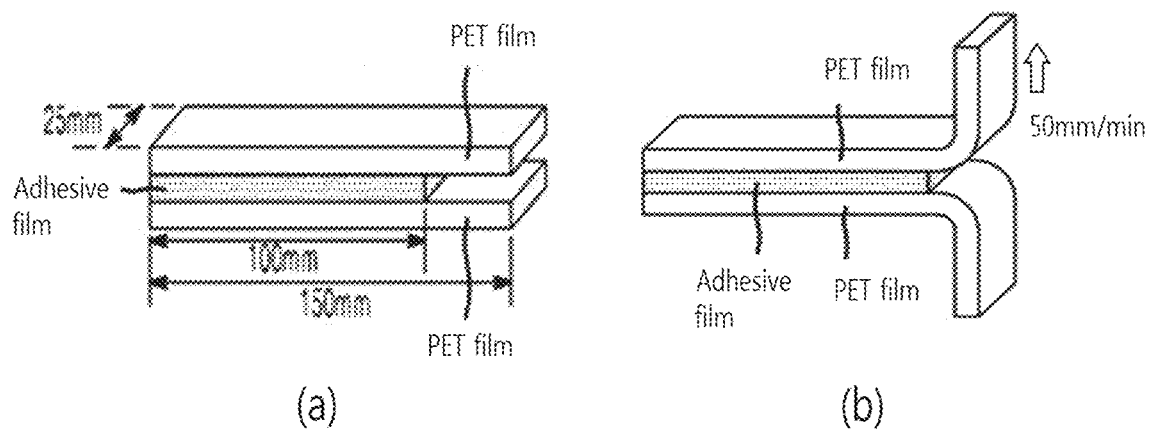
[FIG. 3]

ADHESIVE FILM, OPTICAL MEMBER INCLUDING SAME, AND OPTICAL DISPLAY DEVICE INCLUDING SAME

CROSS-REFERENCE TO RELATED APPLICATIONS

This application is a U.S. National Phase Patent Application of International Application Number PCT/KR2018/005503, filed on May 14, 2018, which claims priority to Korean Patent Application Number 10-2017-0063179, filed on May 22, 2017, the entire contents of both of which are incorporated herein by reference.

TECHNICAL FIELD

The present invention relates to an adhesive film, an optical member including the same, window film including the same, and an optical display including the same.

BACKGROUND ART

An optical display includes display elements including a window film, a conductive film, an organic light emitting diode, and the like. In the optical display, various display elements are attached to each other via optically clear adhesives (OCAs). Recently, a flexible optical display has been developed. To this end, an adhesive film is required to have good foldability while securing good reliability by preventing delamination or bubble generation under temperature variation or thermal impact conditions of high temperature, room temperature and low temperature.

An adhesive film can be used to attach a window film to an adherend in an optical display. Both the window film and the adhesive film can be folded towards the adhesive film or the window film. Since the adhesive film is folded in the tensile direction upon folding the entirety of the window film and the adhesive film towards the window film and is folded in the compression direction upon folding the entirety of the window film and the adhesive film towards the adhesive film, the adhesive film undergoes relatively broad stretching and/or shrinkage. Accordingly, in order to secure good foldability upon folding in the compression direction, the adhesive film is required to endure stretching and/or shrinkage upon folding not only in the tensile direction but also in the compression direction.

The adhesive film is required to have good flexibility at low temperature and to exhibit good restoration and reliability under high temperature and/or high humidity conditions. However, when the adhesive film has good flexibility at low temperature, it is difficult for the adhesive film to secure good reliability under high temperature and/or high humidity conditions. Therefore, there is a need for an adhesive film that exhibits good flexibility at low temperature while securing good restoration and high reliability under high temperature and/or high humidity conditions.

The background technique of the present invention is disclosed in Korean Patent Publication No. 2007-0055363 A.

DISCLOSURE

Technical Problem

It is an object of the present invention to provide an adhesive film having good foldability in a compression direction.

It is another object of the present invention to provide an adhesive film having good foldability even in a tensile direction.

It is a further object of the present invention to provide an adhesive film having low modulus at low temperature to provide good flexibility while securing good flexural reliability at low temperature and under high temperature/humidity conditions.

It is yet another object of the present invention to provide an adhesive film having good peel strength.

It is yet another object of the present invention to provide an adhesive film that is optically clear to be applicable to an optical display.

Technical Solution

In accordance with one aspect of the present invention, an adhesive film is formed of an adhesive composition comprising: a monomer mixture including an alkyl group-containing acrylate and a hydroxyl group-containing acrylate; and an initiator, and has a modulus of 80 kPa or less at −20° C. and a value of 40% to 140%, as calculated by Equation 1:

(stretched length of adhesive film)/(initial thickness of adhesive film)×100,    [Equation 1]

wherein the stretched length of the adhesive film and the initial thickness of the adhesive film are the same as those defined in the following detailed description.

In accordance with another aspect of the present invention, an optical member may include an optical film and an adhesive film formed on at least one surface of the optical film.

In accordance with a further aspect of the present invention, an optical display includes the adhesive film.

Advantageous Effects

The present invention provides an adhesive film having good foldability in a compression direction.

The present invention provides an adhesive film having good foldability even in a tensile direction.

The present invention provides an adhesive film having low modulus at low temperature to provide good flexibility while securing good flexural reliability at low temperature and under high temperature/humidity conditions.

The present invention provides an adhesive film having good peel strength.

The present invention provides an adhesive film that is optically transparent to be applicable to an optical display.

BRIEF DESCRIPTION OF THE DRAWINGS

FIG. 1 is a sectional view of an optical display according to one embodiment of the present invention.

FIG. 2(a) is a side sectional view of a specimen for measurement of a value calculated by Equation 1 and FIG. 2(b) is an upper perspective view of the specimen for measurement of a value calculated by Equation 1.

FIG. 3 is a conceptual diagram of a specimen for measuring peel strength.

BEST MODE

Hereinafter, embodiments of the present invention will be described in detail with reference to the accompanying drawings to allow those skilled in the art to easily practice the present invention. It should be understood that the present invention may be embodied in different ways and is not limited to the following embodiments. In the drawings, portions irrelevant to the description will be omitted for clarity. Like components will be denoted by like reference numerals throughout the specification.

As used herein, spatially relative terms such as "upper" and "lower" are defined with reference to the accompanying drawings. Thus, it will be understood that "upper" can be used interchangeably with "lower". It will be understood that when a layer is referred to as being "on" another layer, it can be directly formed on the other layer, or intervening layer(s) may also be present. Thus, it will be understood that when a layer is referred to as being "directly on" another layer, no intervening layer is interposed therebetween.

As used herein, the term "acryl" refers to acryl and/or methacryl.

Herein, the term "copolymer" may include an oligomer, a polymer, or a resin.

Herein, the "average particle diameter" of organic nanoparticles refers to a particle diameter thereof, as measured in a water-based or organic solvent using a Zetasizer nano-ZS (Malvern Co., Ltd.) and represented by a Z-average value, and observed by SEM/TEM.

Herein, "modulus" means storage modulus (G').

Herein, "value of Equation 1" is measured with reference to FIG. 2(a) and FIG. 2(b).

(Stretched length of adhesive film)/(Initial thickness of adhesive film)×100, <Equation 1> wherein the stretched length of the adhesive film (unit: μm) is measured on a specimen, which is prepared by attaching one end of a first polyimide film (length×width×thickness, 45 mm×15 mm×50 μm) to one end of a second polyimide film (length×width×thickness, 45 mm×15 mm×50 μm) via an adhesive film (length×width×thickness, 15 mm×15 mm×50 μm) in a structure of one end of the first polyimide film/adhesive film/one end of the second polyimide film to have a stepped cross-sectional shape (  ) and is obtained by subtracting an initial length (unit: mm) of the adhesive film from a final length of the adhesive film (unit: mm) (final length of the adhesive film (unit: mm)–initial length (unit: mm) of the adhesive film) when the other end of the second polyimide film is pulled at 0.6 mm/min under a load of 500 gf at 25° C. for 10 minutes, with the other end of the first polyimide film of the specimen secured to a tester; and the initial thickness of the adhesive film (unit: μm) is the thickness of the adhesive film immediately before preparation of the specimen).

The value of Equation 1 can be measured by a TA.XT_Plus Texture Analyzer (Stable Micro System Ltd.), without being limited thereto.

Herein, the term "glass transition temperature (Tg) in a homopolymer phase" may mean a glass transition temperature measured with respect to a homopolymer of a target monomer using a DSC Discovery (TA Instrument Inc.). Specifically, the homopolymer of the target monomer is heated to 180° C. at a heating rate of 20° C./min, slowly cooled to –180° C., and heated to 100° C. at a rate of 10° C./min in order to obtain an endothermic transition curve. An inflection point of the endothermic transition curve can be determined as the glass transition temperature.

Hereinafter, an adhesive film according to one embodiment of the present invention will be described.

The adhesive film according to the embodiment of the invention (hereinafter, 'adhesive film') is formed of an adhesive composition comprising: a monomer mixture including an alkyl group-containing acrylate and a hydroxyl group-containing acrylate; and an initiator, and has a value of 40% to 140% at 25° C. (20° C. to 30° C.), as calculated by Equation 1, and a modulus of 80 kPa or less at –20° C.

The value of Equation 1 is a value for evaluating the degree of relieving stress on the adhesive film, which is being folded in compressed direction upon folding of the adhesive film together with the stacked structure of the adherend formed on adhesive film in direction of the adhesive film. The value of Equation 1 is a value for evaluating foldability of the adhesive film upon folding the stacked structure in the direction of the adhesive film under high temperature and/or high humidity conditions and/or at low temperature. When the adhesive film has a value of 40% to 140%, as calculated by Equation 1, the adhesive film can exhibit good foldability when folded in the direction of the adhesive film at room temperature and/or under high temperature/humidity conditions, and can also have good properties in terms of flexural reliability and reliability under high temperature/humidity conditions. Preferably, the adhesive film has a value of 50% to 120%, more preferably 60% to 100%, as calculated by Equation 1.

For evaluation of flexural properties of the adhesive film, a specimen is prepared by stacking an adhesive film (thickness: 100 μm) on a PET film (thickness: 50 μm), followed by cutting the stacked films to a size of 70 mm×140 mm. Then, the specimen is secured to a flexibility tester and is subjected to repeated cycles of bending in the longitudinal direction of the specimen and in the direction of the adhesive film under conditions of –20° C. or 60° C. and 93% RH (relative humidity) at 30 cycles per minute such that a bent portion of the specimen has a radius of curvature of 3 mm, in which 1 cycle means an operation of bending the specimen to have the radius of curvature, followed by unfolding the adhesive film back to an original state. When the number of bending cycles was recorded until the specimen is delaminated or bubbles are generated in the specimen, the adhesive film can allow 100,000 cycles or more of bending. Within this range, the adhesive film has good reliability and is applicable to a flexible display.

The adhesive film may have a modulus of 80 kPa or less at –20° C. Within this range, the adhesive film can exhibit good flexibility at low temperature, thereby providing good flexural reliability, particularly, when bent in the compression direction at low temperature. At –20° C., the adhesive film preferably has a modulus of 40 kPa to 80 kPa more preferably 40 kPa to 70 kPa, still more preferably 40 kPa to 65 kPa.

As such, the adhesive film of the current invention exhibits good flexibility at low temperature while securing good restoration and reliability under high temperature and/or high humidity conditions.

The adhesive film may have a ratio of modulus at 80° C. to modulus at –20° C. of 1:1 to 1:10, specifically 1:1 to 1:8, more specifically 1:1 to 1:5. Within this range, the adhesive film may have a low ratio of modulus at low temperature to modulus at high temperature to provide good durability and reliability, does not suffer from deterioration in adhesion between adherends in a broad temperature range (–20° C. to 80° C.), and is applicable to a flexible optical member.

The adhesive film may have a modulus of 10 kPa to 200 kPa at 80° C., specifically 12 kPa to 100 kPa. Within this range, the adhesive film can have improved reliability at high temperature. The adhesive film may have a modulus of 15 kPa to 300 kPa at 25° C., specifically 20 kPa to 200 kPa.

Within this range, the adhesive film can exhibit viscoelasticity at room temperature while securing good restoration and foldability.

The adhesive film may have a peel strength of 700 gf/in or more at 25° C., specifically 900 gf/in or more, specifically 900 gf/in to 3,000 gf/in. Within this range, the adhesive film can have good durability. Herein, "peel strength" refers to T-peel strength.

The adhesive film may have a glass transition temperature (Tg) of −100° C. to −10° C., specifically −70° C. to −35° C. Within this range, the adhesive film can have improved folding reliability not only at low temperature but also at high temperature. Preferably, the adhesive film may have a glass transition temperature of −70° C. to −45° C. Within this range, the adhesive film can have improved folding reliability not only at low temperature but also at high temperature and can relieve stress upon folding in the tensile direction, thereby securing good foldability.

The adhesive film may have a haze value of 2% or less, specifically 0.1% to 1%, and a total light transmittance of 90% or more, specifically 95% to 99%, in the visible range (for example: in a wavelength range of 380 nm to 780 nm). Within this range, the adhesive film has good optical transparency and is applicable to an optical display.

The adhesive film may have a thickness of 10 μm to 300 μm, specifically 12 μm to 175 μm. Within this thickness range, the adhesive film is applicable to an optical display.

The adhesive film according to the embodiment may be formed by photocuring the adhesive composition. The adhesive composition may include a monomer mixture and an initiator, in which the monomer mixture forms a hydroxyl group-containing acrylic copolymer. The monomer mixture may be present in a non-polymerized state or in a partially polymerized state in the adhesive composition.

The monomer mixture may form the hydroxyl group-containing acrylic copolymer. The hydroxyl group-containing acrylic copolymer forms a matrix of the adhesive film and can provide adhesive properties to the adhesive film. The hydroxyl group-containing acrylic copolymer may have a glass transition temperature of −100° C. to 10° C., specifically −70° C. to 0° C. Within this range, the adhesive film can exhibit good adhesive strength and reliability in a broad temperature range. The hydroxyl group-containing acrylic copolymer may have an index of refraction of 1.35 to 1.70, specifically 1.40 to 1.60. Within this range, the adhesive film can maintain transparency when stacked on other optical films.

The monomer mixture may include an alkyl group-containing acrylate and a hydroxyl group-containing acrylate. The adhesive film including the monomer mixture, which includes the alkyl group-containing acrylate and the hydroxyl group-containing acrylate described in detail below, has the value of Equation 1 in the aforementioned range, thereby securing good foldability upon folding in the compression direction and good flexural reliability at low temperature and under high temperature/humidity conditions.

The alkyl group-containing acrylate may include a mixture of a first alkyl group-containing acrylate, which is a non-alkylene glycol-based acrylate having a glass transition temperature of −20° C. to −55° C. in a homopolymer phase and free from an alkylene glycol group, and a second alkyl group-containing acrylate, which is an alkylene glycol-based acrylate having a glass transition temperature of −55° C. to −90° C. in a homopolymer phase and containing an alkylene glycol group. When the alkyl group-containing acrylate contains the first alkyl group-containing acrylate alone, the adhesive film has high modulus at low temperature, thereby providing poor flexural reliability at low temperature. When the alkyl group-containing acrylate contains the second alkyl group-containing acrylate alone, the adhesive film has a value of Equation 1 outside of the aforementioned range and thus can exhibit poor foldability in the compression direction. The first alkyl group-containing acrylate and the second alkyl group-containing acrylate have different glass transition temperatures in a homopolymer phase thereof.

The first alkyl group-containing acrylate may have a glass transition temperature of −20° C. to −55° C. in a homopolymer phase. Within this range, the adhesive film can exhibit good flexural reliability at low temperature and under high temperature/humidity conditions. Preferably, the first alkyl group-containing acrylate has a glass transition temperature of −35° C. to −55° C. in a homopolymer phase. The first alkyl group-containing acrylate may include a monofunctional acrylate containing an unsubstituted $C_1$ to $C_{20}$ linear or branched alkyl group.

For example, the first alkyl group-containing acrylate may include at least one of 2-ethylhexyl acrylate, n-butyl acrylate, iso-octyl acrylate, propyl acrylate, t-butyl acrylate, iso-butyl acrylate, pentyl acrylate, hexyl acrylate, heptyl acrylate, octyl acrylate, nonyl acrylate, and decyl acrylate, preferably at least one of 2-ethylhexyl acrylate, n-butyl acrylate, and iso-octyl acrylate, more preferably 2-ethylhexyl acrylate.

In the monomer mixture (preferably, based on the total amount of the alkyl group-containing acrylate and the hydroxyl group-containing acrylate), the first alkyl group-containing acrylate may be present in an amount of 20 wt % to 75 wt %, preferably 40 wt % to 70 wt %, or 40 wt % to 60 wt %. Within this range, the adhesive film can exhibit good flexural reliability at low temperature and under high temperature/humidity conditions.

The second alkyl group-containing acrylate may have a glass transition temperature of −55° C. to −90° C. in a homopolymer phase. Within this range, the adhesive film can have low modulus at low temperature while securing good foldability in the compression direction. Preferably, the second alkyl group-containing acrylate has a glass transition temperature of −60° C. to −90° C. in a homopolymer phase, more preferably −60° C. to −75° C. The second alkyl group-containing acrylate may include a monofunctional acrylate containing an ethylene oxide group ($-CH_2CH_2O-$) or a propylene oxide group ($-CH_2CH_2CH_2O-$), preferably an ethylene oxide group.

For example, the second alkyl group-containing acrylate may include at least one of methoxypolyethylene glycol acrylate containing 6 to 13 moles of ethylene glycol, ethylhexylpolyethylene glycol acrylate containing 2 to 10 moles of ethylene glycol, and octylpolyethylene glycol acrylate. Preferably, second alkyl group-containing acrylate may include at least one of methoxypolyethylene glycol acrylate (containing 6 moles of ethylene glycol), methoxypolyethylene glycol acrylate (containing 9 moles of ethylene glycol), methoxypolyethylene glycol acrylate (containing 13 moles of ethylene glycol), ethylhexyldiethylene glycol acrylate, ethylhexyltriethylene glycol acrylate, and octyldiethylene glycol acrylate.

In the monomer mixture (preferably, based on the total amount of the alkyl group-containing acrylate and the hydroxyl group-containing acrylate), the second alkyl group-containing acrylate may be present in an amount of 10 wt % to 40 wt %, preferably 20 wt % to 40 wt %. Within this range, the adhesive film can have improved foldability in the compression direction.

The second alkyl group-containing acrylate may be present in the same amount as the first alkyl group-containing acrylate, or may be present in a lower amount than the first alkyl group-containing acrylate. As a result, the adhesive film can exhibit good foldability both in the compression direction and in the tensile direction, thereby securing good flexural reliability. For example, the first alkyl group-containing acrylate and the second alkyl group-containing acrylate may be present in a weight ratio of 1:1 to 6:1, preferably 1:1 to 3:1. Within this range, the adhesive film can have improved flexural reliability while securing good foldability in the compression direction.

The alkyl group-containing acrylate, that is, the mixture of the first alkyl group-containing acrylate and the second alkyl group-containing acrylate, may be present in an amount of 60 wt % to 90 wt %, preferably 70 wt % to 90 wt %, more preferably 70 wt % to 85 wt %, based on the total amount of the alkyl group-containing acrylate and the hydroxyl group-containing acrylate. Within this range, the adhesive film can have further improved adhesive strength and durability.

The hydroxyl group-containing acrylate can provide adhesive strength to the adhesive film. The hydroxyl group-containing acrylate has a glass transition temperature of 0° C. to −40° C. in a homopolymer phase, preferably −10° C. to −40° C., more preferably −20° C. to −40° C. Within this range, the adhesive film can exhibit improved adhesive strength and flexural reliability. The hydroxyl group-containing acrylate may be an acrylate containing at least one hydroxyl group. For example, the hydroxyl group-containing acrylate may include at least one of 2-hydroxybutyl acrylate, 4-hydroxybutyl acrylate, 2-hydroxyethyl acrylate, 2-hydroxypropyl acrylate, 3-hydroxypropyl acrylate, 6-hydroxyhexyl acrylate, and diethylene glycol monoacrylate.

In the monomer mixture (preferably, based on the total amount of the alkyl group-containing acrylate and the hydroxyl group-containing acrylate), the hydroxyl group-containing acrylate may be present in an amount of 10 wt % to 40 wt %, for example, 10 wt % to 30 wt %, or 15 wt % to 30 wt %. Within this range, the adhesive film can have further improved adhesive strength and durability.

The monomer mixture may further include a copolymerizable monomer. In the acrylic copolymer, the copolymerizable monomer can provide additional effects to the acrylic copolymer, the adhesive composition or the adhesive film. The copolymerizable monomer may include at least one of an amine group-containing monomer, an alkoxy group-containing monomer, a phosphoric acid group-containing monomer, a sulfonic acid group-containing monomer, a phenyl group-containing monomer, a silane group-containing monomer, a carboxylic acid group-containing monomer, and an amide group-containing acrylate, which are different from the hydroxyl group-containing acrylate and the alkyl group-containing acrylate.

The amine group-containing monomer may include amine group-containing acrylate monomers, such as monomethylaminoethyl acrylate, monoethylaminoethyl acrylate, monomethylaminopropyl acrylate, monoethylaminopropyl acrylate, dimethylaminoethyl acrylate, diethylaminoethyl acrylate, N-tert-butylaminoethyl acrylate, and acryloxyethyltrimethyl ammonium chloride acrylate, without being limited thereto.

The alkoxy group-containing monomer may include 2-methoxy ethyl acrylate, 2-methoxypropyl acrylate, 2-ethoxypropyl acrylate, 2-butoxypropyl acrylate, 2-methoxypentyl acrylate, 2-ethoxypentyl acrylate, 2-butoxyhexyl acrylate, 3-methoxypentyl acrylate, 3-ethoxypentyl acrylate, and 3-butoxyhexyl acrylate, without being limited thereto.

The phosphoric acid group-containing monomer may include phosphoric acid group-containing acrylic monomers, such as 2-methacryloyloxyethyldiphenylphosphate acrylate, trimethacryloyloxyethylphosphate acrylate, and triacryloyloxyethylphosphate acrylate, without being limited thereto.

The sulfonic acid group-containing monomer may include sulfonic acid group-containing acrylic monomers, such as sodium sulfopropyl acrylate, sodium 2-sulfoethyl acrylate, and sodium 2-acrylamido-2-methylpropane sulfonate, without being limited thereto.

The phenyl group-containing monomer may include phenyl group-containing acrylic vinyl monomers, such as p-tert-butylphenyl acrylate, o-biphenyl acrylate, and phenoxyethyl acrylate, without being limited thereto.

The silane group-containing monomer may include silane group-containing vinyl monomers, such as 2-acetoacetoxyethyl acrylate, vinyltrimethoxysilane, vinyltriethoxysilane, vinyl tris(2-methoxyethyl)silane, vinyltriacetoxysilane, and acryloyloxypropyltrimethoxysilane, without being limited thereto.

The carboxylic acid group-containing monomer may include acrylic acid, 2-carboxyethyl acrylate, 3-carboxypropyl acrylate, 4-carboxybutyl acrylate, itaconic acid, crotonic acid, maleic acid, fumaric acid, and maleic anhydride, without being limited thereto.

The amide group-containing monomer may include acrylamide, N-methyl acrylamide, N-methylol acrylamide, N-methoxymethyl acrylamide, N,N-methylene bisacrylamide, N-hydroxyethyl acrylamide, and N,N-diethyl acrylamide, without being limited thereto.

The copolymerizable monomer may be present in an amount of 15 parts by weight or less, specifically 10 parts by weight or less, more specifically 0.05 parts by weight to 8 parts by weight, relative to 100 parts by weight of the hydroxyl group-containing acrylate and the alkyl group-containing acrylate. Within this range, the adhesive composition can further improve adhesive strength and recovery of the adhesive film.

The carboxylic acid group-containing monomer may be present in an amount of 5 parts by weight or less, specifically 3 parts by weight or less, more specifically 1 part by weight or less, relative to 100 parts by weight of the hydroxyl group-containing acrylate and the alkyl group-containing acrylate. Within this range, the adhesive composition can further improve adhesive strength and durability of the adhesive film.

The initiator may be used to form an acrylic copolymer by curing (partially polymerizing) the monomer mixture, or to cure a viscous liquid into a film. The initiator may include at least one of a photopolymerization initiator and a thermal polymerization initiator.

The photopolymerization initiator may be any initiator so long as the initiator can induce polymerization of a radical polymerizable compound during curing through light irradiation. For example, the photopolymerization initiator may include benzoin, hydroxy ketone, amino ketone, phosphine oxide photoinitiators, and the like. Specifically, the photopolymerization initiator may include benzoin, benzoin methyl ether, benzoin ethyl ether, benzoin isopropyl ether, benzoin n-butyl ether, benzoin isobutyl ether, acetophenone compounds such as 2,2-dimethoxy-2-phenylacetophenone, 2,2'-diethoxyacetophenone, 2,2'-dibutoxyacetophenone, 2-hydroxy-2-methylpropiophenone, p-t-butyl trichloroacetophenone, p-t-butyl dichloroacetophenone, 4-chloroacetophenone, 2,2'-dichloro-4-phenoxyacetophenone, dimethylamino acetophenone, 2,2-dimethoxy-2-phenylacetophenone, and 2,2-diethoxy-2-phenylacetophenone, 2-hydroxy-2-methyl-1-phenylpropan-1-one, 2-benzyl-2-dimethyl amino-1-(4-morpholinophenyl)-butane-1-one, 1-hydroxycyclohexylphenylketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethylketal, acetophenone dimethylketal, p-dimethylaminobenzoic acid ester, oligo[2-hydroxy-2-methyl-1-[4-(1-methylvinyl)phenyl]propanone], and 2,4,6-trimethylbenzoyl-diphenyl-phosphine oxide, without being limited thereto. These photopolymerization initiators may be used alone or in combination thereof.

The thermal polymerization initiator may be any typical initiator, for example, azo, peroxide and redox compounds, so long as the initiator can realize the above properties. Examples of the azo compound may include 2,2-azobis(2-methylbutyronitrile), 2,2-trilazobis(isobutyronitrile), 2,2-trilazobis(2,4-dimethylvale-ronitrile), 2,2-nitazobis-2-hydroxymethylpropionitrile, dimethyl-2,2-methylazobis-(2-methylpropionate), and 2,2-pioazobis(4-methoxy-2,4-dimethylvaleronitrile), without being limited thereto. Examples of the peroxide compound may include: inorganic peroxides such as potassium persulfate, ammonium persulfate, and hydrogen peroxide; and organic peroxides such as diacyl peroxide, peroxy dicarbonate, peroxy ester, tetramethylbutyl peroxy neodecanoate, bis(4-butylcyclohexyl)peroxydicarbonate, di(2-ethylhexyl)peroxy carbonate, butylperoxy neodecanoate, dipropyl peroxydicarbonate, diisopropyl peroxydicarbonate, diethoxyethyl peroxydicarbonate, diethoxyhexyl peroxydicarbonate, hexylperoxydicarbonate, dimethoxybutyl peroxydicarbonate, bis(3-methoxy-3-methoxybutyl) peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethyl hydroxybutyl peroxyneodecanoate, amyl peroxyneodecanoate, butyl peroxyneodecanoate, t-butylperoxy neoheptanoate, amyl peroxypivalate, t-butyl peroxypivalate, t-amyl peroxy-2-ethylhexanoate, lauroyl peroxide, dilauroyl peroxide, didecanoyl peroxide, benzoyl peroxide, and dibenzoyl peroxide, without being limited thereto. Examples of the redox compound may include mixtures of a peroxide compound and a reductant, without being limited thereto. These azo, peroxide and redox compounds may be used alone or in combination thereof.

The initiator may be present in an amount of 0.0001 parts by weight to 5 parts by weight, specifically 0.001 parts by weight to 3 parts by weight, more specifically 0.001 parts by weight to 1 part by weight, relative to 100 parts by total weight of the hydroxyl group-containing acrylate and the alkyl group-containing acrylate or 100 parts by weight of the monomer mixture which form the acrylic copolymer. Within this range, the initiator allows complete curing of the adhesive composition, can prevent deterioration in transmittance of the adhesive film due to residual initiator, can reduce bubble generation, and can exhibit good reactivity.

The adhesive composition may further include organic nanoparticles.

The organic nanoparticles can increase the modulus of the adhesive film at high temperature and can further improve reliability of the adhesive film at high temperature by preventing delamination, slight lifting and/or bubble generation at high temperature. The organic nanoparticles have a high glass transition temperature, thereby improving the modulus of the adhesive film at high temperature.

The organic nanoparticles may have an average particle diameter of 10 nm to 400 nm, specifically 10 nm to 300 nm, more specifically 30 nm to 280 nm, still more specifically 50 nm to 280 nm. Within this range of average particle diameter, the organic nanoparticles do not affect foldability of the adhesive film and can secure good transparency of the adhesive film by securing a total light transmittance of 90% or more in the visible range.

A difference in index of refraction between the organic nanoparticles and the hydroxyl group-containing acrylic copolymer may be 0.1 or less, specifically 0 to 0.05, specifically 0 to 0.02. Within this range, the adhesive film can exhibit good transparency. The organic nanoparticles may have an index of refraction of 1.35 to 1.70, specifically 1.40 to 1.60. Within this range, the adhesive film can exhibit good transparency.

The organic nanoparticles may have a core-shell structure or a simple structure such as bead type nanoparticles, without being limited thereto. In one embodiment, the organic nanoparticles may have a core-shell structure, in which the core and the shell satisfy Equation 2. That is, the organic nanoparticles may include nanoparticles in which the core and the shell are formed of organic materials. With the organic nanoparticles having the core-shell structure, the adhesive film can exhibit good foldability and balance between elasticity and flexibility.

$$Tg(c) < Tg(s) \qquad \text{<Equation 2>}$$

wherein Tg(c) is the glass transition temperature (unit: °C.) of the core and Tg(s) is the glass transition temperature (unit: °C.) of the shell.

Herein, the term "shell" means an outermost layer of the organic nanoparticle. The core may be a spherical particle. In some embodiments, the core may include an additional layer surrounding the spherical particle so long as the core has a glass transition temperature satisfying the above equation.

Specifically, the core may have a glass transition temperature of −150° C. to 10° C., specifically −150° C. to −5° C., more specifically −150° C. to −20° C. Within this range, the adhesive film can have good viscoelasticity at low temperature and/or at room temperature. The core may include at least one of poly(alkyl acrylate), polysiloxane and polybutadiene each having a glass transition temperature within this range.

The poly(alkyl acrylate) may include at least one of poly(methyl acrylate), poly(ethyl acrylate), poly(propyl acrylate), poly(butyl acrylate), poly(isopropyl acrylate), poly(hexyl acrylate), poly(hexyl methacrylate), poly(ethylhexyl acrylate), poly(ethylhexyl methacrylate), and polysiloxane without being limited thereto.

The polysiloxane may be, for example, an organosiloxane (co)polymer. The organosiloxane (co)polymer may be a non-crosslinked or crosslinked organosiloxane (co)polymer. The crosslinked organosiloxane (co)polymer may be used to secure impact resistance and colorability. Specifically, the crosslinked organosiloxane (co)polymer may include crosslinked dimethylsiloxane, methylphenylsiloxane, diphenylsiloxane, and mixtures thereof. With a copolymer of two or more organosiloxanes, the nanoparticles can have an index of refraction of 1.41 to 1.50.

A crosslinked state of the organosiloxane (co)polymer can be determined based on the degree of dissolution in various organic solvents. As the degree of crosslinking of the organosiloxane (co)polymer intensifies, the degree of dissolution of the organosiloxane (co)polymer is reduced. A solvent for determination of the crosslinked state may include acetone, toluene, and the like. Specifically, the organosiloxane (co)polymer may have a moiety which is not dissolved in acetone or toluene. The organosiloxane copolymer may include about 30% or more of insolubles in toluene.

The organosiloxane (co)polymer may further include an alkyl acrylate crosslinked polymer. The alkyl acrylate crosslinked polymer may include methyl acrylate, ethyl acrylate, n-butyl acrylate, 2-ethylhexyl acrylate, and the like. For example, the alkyl acrylate crosslinked polymer may be n-butyl acrylate or 2-ethylhexyl acrylate having a low glass transition temperature.

Specifically, the shell may have a glass transition temperature of about 15° C. to about 150° C., specifically about 35° C. to about 150° C., more specifically about 50° C. to about 140° C. Within this range, the organic nanoparticles can exhibit good dispersion in the acrylic copolymer. The shell may include poly(alkyl methacrylate) having a glass transition temperature within this range. For example, the shell may include at least one of poly(methyl methacrylate) (PMMA), poly(ethyl methacrylate), poly(propyl methacrylate), poly(butyl methacrylate), poly(isopropyl methacrylate), poly(isobutyl methacrylate), and poly(cyclohexyl methacrylate), without being limited thereto.

In the organic nanoparticles, the core may be present in an amount of 30 wt % to 99 wt %, specifically 40 wt % to 95 wt %, more specifically 50 wt % to 90 wt %. Within this range, the adhesive film can exhibit good foldability in a wide temperature range. In the organic nanoparticles, the shell may be present in an amount of 1 wt % to 70 wt %, specifically 5 wt % to 60 wt %, more specifically 10 wt % to 50 wt %. Within this range, the adhesive film can exhibit good foldability in a wide temperature range.

The organic nanoparticles may be present in an amount of 0.1 parts by weight to 20 parts by weight, specifically 0.5 parts by weight to 10 parts by weight, specifically 0.5 parts by weight to 3 parts by weight, relative to 100 parts by weight of the monomer mixture or 100 parts by total weight of the hydroxyl group-containing acrylate and the alkyl group-containing acrylate. Within this range, the organic nanoparticles can secure good properties in terms of modulus of the adhesive film at high temperature, foldability of the adhesive film at room temperature and high temperature, and viscoelasticity of the adhesive film at low temperature and/or room temperature.

The organic nanoparticles may be prepared by typical emulsion polymerization, suspension polymerization, or solution polymerization.

The adhesive composition may further include a crosslinking agent. The crosslinking agent can increase mechanical strength of the adhesive film through improvement in crosslinking degree of the adhesive composition.

The crosslinking agent may have a low glass transition temperature such that the homopolymer has a glass transition temperature of 40° C. to −60° C., preferably 20° C. to −40° C. Within this range, the adhesive film can have good flexibility at low temperature and improved reliability.

The crosslinking agent may include a polyfunctional acrylate capable of being cured by actinic radiation. Specifically, the crosslinking agent may include polyethylene glycol diacrylate (glass transition temperature: −40° C. in a homopolymer state) including polyethylene glycol (600) diacrylate (SR610), and the like.

The crosslinking agent may be optionally present in an amount of 0.001 parts by weight to 5 parts by weight, specifically 0.003 parts by weight to 3 parts by weight, specifically 0.005 parts by weight to 1 part by weight, relative to 100 parts by weight of the hydroxyl group-containing acrylate and the alkyl group-containing acrylate. Within this range, the adhesive film exhibits good adhesive strength and improved reliability.

The adhesive composition may have a viscosity of 300 cPs to 50,000 cPs m at 25° C. Within this viscosity range, the adhesive composition can have good coatability and thickness uniformity.

The adhesive composition may be prepared through partial polymerization of the monomer mixture for the hydroxyl group-containing acrylic copolymer with the initiator, followed by adding at least one of an additional initiator and additional organic nanoparticles. The crosslinking agent and the additives described above may be further added to the adhesive composition. Alternatively, the adhesive composition may be prepared by partially polymerizing a mixture including the monomer mixture for the hydroxyl group-containing acrylic copolymer and the initiator, followed by adding at least one of an additional initiator and additional organic nanoparticles. The crosslinking agent and the additives described above may be further added to the mixture. Partial polymerization may include solution polymerization, suspension polymerization, photopolymerization, bulk polymerization, or emulsion polymerization. Specifically, solution polymerization may be performed at 50° C. to 100° C. by adding an initiator to the monomer mixture. The initiator may include a photopolymerization initiator such as 1-hydroxycyclohexylphenyl keton and an acetophenone such as 2,2-dimethoxy-2-phenylacetophenone and the like, without being limited thereto. Partial polymerization may be performed to achieve a viscosity of 300 cPs to 50,000 cPs at 25° C., specifically 500 cPs to 9,000 cPs. The adhesive film may be produced by a typical method. For example, the adhesive film may be produced by coating the adhesive composition onto a release film, followed by curing. Curing may be performed under a low-pressure lamp at a wavelength of 300 nm to 400 nm and a dose of 400 mJ/cm$^2$ to 3,000 mJ/cm$^2$ in an oxygen-free state.

An optical member according to one embodiment of the invention includes an optical film, and an adhesive film formed on at least one surface of the optical film, wherein the adhesive film includes the adhesive film according to the embodiments of the invention. Accordingly, the optical member exhibits good bending properties and/or good foldability and thus can be used in a flexible display.

In one embodiment, the optical film provides optical functions, for example, polarization, optical compensation, display quality improvement and/or conductivity, to a display. Examples of the optical film may include a window film, a window, a polarizing plate, a color filter, a retardation film, an elliptical polarizing film, a reflective polarizing film, an anti-reflection film, a compensation film, a brightness improving film, an alignment film, a light diffusion film, a glass shatterproof film, a surface protective film, an OLED device barrier layer, a plastic LCD substrate, and a transparent electrode film including indium tin oxide (ITO), fluorinated tin oxide (FTO), aluminum-doped zinc oxide (AZO), carbon nanotubes (CNT), Ag nanowires, graphene, or the like. These optical films may be easily manufactured by those of ordinary skill in the art.

For example, a touch pad may be attached to a window film or an optical film via the adhesive film, thereby forming a touch panel. Alternatively, the adhesive film may be applied to a typical polarizing film as in the related art.

In another embodiment, the optical film is an optically clear film and an optical member including the optical film and the adhesive film may act as a support layer for a display element. For example, the display element may include a window film and the like. The window film may include the optical member and a window coating layer (for example: a silicone coating layer) formed on the optical member. Specifically, the optical film may have a total light transmittance of 90% or more in the visible range and may be formed of at least one resin selected from among cellulose resins such as triacetylcellulose, polyester resins such as polyethylene terephthalate, polyethylene naphthalate, polybutylene terephthalate and polybutylene naphthalate, polycarbonate resins, polyimide resins, polystyrene resins, polyacrylate resins such as poly(methyl methacrylate), cyclic olefin polymer resins, acrylic resins, and polyamide resins. The optical film may have a thickness of 10 μm to 100 μm, specifically 20 μm to 75 μm, more specifically 30 μm to 50 μm. Within this thickness range, the optical member can be used as the support layer for the display element.

The optical member may be a two-layer optical film laminate that includes an optical film and the adhesive film formed on one surface of the optical film. Alternatively, the optical member may be a three- or more layer film laminate that includes at least two optical films attached to each other via the adhesive film according to the present invention.

In one embodiment, the optical member may be a three-layer film laminate that includes a first optical film, a second optical film, and an adhesive film interposed between the first optical film and the second optical film to attach the first optical film to the second optical film, wherein the adhesive film is the adhesive film according to the present invention. Each of the first optical film and the second optical film may be formed of at least one resin selected from among a polyethylene terephthalate resin, a polycarbonate resin, a polyimide resin, a polyacrylate resin, a cyclic olefin polymer resin, and an acrylic resin. Each of the first optical film and the second optical film may have a thickness of 10 μm to 100 μm, specifically 20 μm to 75 μm, more specifically 30 μm to 50 μm, and the adhesive film may have a thickness of 10 μm to 100 μm. Within this thickness range, the optical member can maximize impact resistance while maintaining good foldability. The first optical film and the second optical film may have same or different thicknesses and may be formed of same or different materials.

An optical display according to one embodiment of the present invention includes the adhesive film according to the present invention. The optical display may include an organic light emitting display, a liquid crystal display, and the like. The optical display may include a flexible display. In other embodiments, the optical display may include a non-flexible display.

Next, a flexible display according to one embodiment of the present invention will be described with reference to FIG. 1. FIG. 1 is a sectional view of a flexible display according to one embodiment of the present invention.

Referring to FIG. 1, a flexible display 100 according to one embodiment of the present invention includes a display part 110, an adhesive layer 120, a polarizing plate 130, a touchscreen panel 140, and a flexible window film 150, wherein the adhesive layer 120 may include the adhesive film according to the embodiments of the invention.

The display part 110 serves to drive the flexible display 100, and may include a substrate and an optical device including an OLED, an LED, a QLED (quantum dot light emitting diode), or an LCD element formed on the substrate. Although not shown in FIG. 1, the display part 110 may include a lower substrate, a thin film transistor, organic light emitting diodes, a flattening layer, a protective layer, and an insulating layer.

The polarizing plate 130 can realize polarization of internal light or prevent reflection of external light to realize a display, or can increase contrast of the display. The polarizing plate may be composed of a polarizer alone. Alternatively, the polarizing plate may include a polarizer and a protective film formed on one or both surfaces of the polarizer. Alternatively, the polarizing plate may include a polarizer and a protective coating layer formed on one or both surfaces of the polarizer. As the polarizer, the protective film and the protective coating layer, a typical polarizer, a typical protective film and a typical protective coating layer known in the art may be used.

The touchscreen panel 140 generates electrical signals through detection of variation in capacitance when a human body or a conductor such as a stylus touches the touchscreen panel 140, and the display part 110 may be driven by such electrical signals. The touchscreen panel 140 is formed by patterning a flexible conductor, and may include first sensor electrodes and second sensor electrodes each formed between the first sensor electrodes and intersecting the first sensor electrodes. The touchscreen panel 140 may include a conductive material such as metal nanowires, conductive polymers, and carbon nanotubes, without being limited thereto.

Although the touchscreen panel 140 is shown as being stacked on the polarizing plate 130 via the adhesive film or a bonding film in FIG. 1, the touchscreen panel 140 may be integrally formed with the polarizing plate 130 by incorporating the polarizer or the polarizing plate therein.

The flexible window film 150 is formed as the outermost layer of the flexible display 100 to protect the flexible display.

Although not shown in FIG. 1, the adhesive films according to the embodiments of the invention may be further formed between the polarizing plate 130 and the touchscreen panel 140 and/or between the touchscreen panel 140 and the flexible window film 150 to reinforce bonding between the polarizing plate, the touchscreen panel, and the flexible window film.

Next, the present invention will be described in detail with reference to some examples. However, it should be understood that these examples are provided for illustration only and are not to be construed in any way as limiting the present invention.

Preparative Example: Preparation of Organic Nanoparticles

Organic nanoparticles were prepared by emulsion polymerization. The core was formed of poly(butyl acrylate) and the shell was formed of poly(methyl methacrylate). In the organic nanoparticles, the shell was present in an amount of 35 wt % and the core was present in an amount of 65 wt %, and the organic nanoparticles had an average particle diameter of 100 nm and an index of refraction of 1.48.

Example 1

100 parts by weight of a monomer mixture of the hydroxyl group-containing acrylate and the alkyl group-containing acrylate as listed in Table 1, 0.005 parts by weight of an initiator (Irgacure 651) and 1 part by weight of the organic nanoparticles prepared in Preparative Example were sufficiently mixed in a reactor. After replacing dissolved oxygen in the reactor with nitrogen gas, the mixture was subjected to partial polymerization through irradiation with UV light for several minutes using a low-pressure mercury lamp, thereby preparing a viscous liquid having a viscosity of 5,000 cPs at 25° C. 0.3 parts by weight of an initiator (Irgacure 651) and 0.05 parts by weight of a crosslinking agent were added to the viscous liquid and mixed therewith, thereby preparing an adhesive composition. The adhesive composition was coated onto a polyethylene terephthalate (PET) release film and irradiated with UV light at a dose of 2,000 mJ/cm², thereby preparing an adhesive sheet in which an adhesive film is stacked on the PET film.

Examples 2 to 4

Each adhesive sheet of an adhesive film and a PET film was fabricated in the same manner as in Example 1 except that the components of the adhesive composition were changed as listed in Table 1.

Comparative Examples 1 to 3

Each adhesive sheet of an adhesive film and a PET film was fabricated in the same manner as in Example 1 except that the components of the adhesive composition were changed as listed in Table 1.

Reference Example 1

An adhesive sheet of an adhesive film and a PET film was fabricated in the same manner as in Example 1 except that HDDA was used as the crosslinking agent instead of SR610.

The adhesive films were removed from the adhesive sheets prepared in Examples and Comparative Examples and were evaluated as to the properties as listed in Table 1, and evaluation results are shown in Table 1.

(1) Modulus: Viscoelasticity was measured under autostrain conditions at a shear rate of 1 rad/sec and a strain of 1% using a rheometer (MCR-501, Anton Paar Co., Ltd.). Plural adhesive films prepared in each of Examples and Comparative Examples were stacked to a thickness of 400 μm, followed by punching the stack using an 8 mm diameter punching machine, thereby preparing a specimen. With a load of 300 gf applied to the specimen using an 8 mm jig, modulus was measured at −20° C., 25° C. and 80° C. while increasing temperature from −60° C. to 90° C. at a temperature increase rate of 5° C./min.

(2) Value of Equation 1: Referring to FIG. 2(a) and FIG. 2(b), A specimen was prepared by attaching two polyimide (PI) films (length×width×thickness, 45 mm×15 mm×50 μm) 11, 12 via an adhesive film (length×width×thickness, 15 mm×15 mm×50 μm) 20 to have a stepped cross-sectional shape ( ⌐_ ) A contact area 20A between each of the PI film 11, 12 and the adhesive film 20 was the same as that of the adhesive film (length×width, 15 mm×15 mm). With one end of the PI film 11 of the specimen secured to a TA.XT_Plus texture analyzer (Stable Micro System Co., Ltd.), the other PI film 12 was pulled at 0.6 mm/min under a load of 500 gf at 25° C. for 10 minutes. Then, stretched length of the adhesive film was calculated by subtracting an initial length (unit: mm) of the adhesive film from a final length of the adhesive film (unit: mm) (final length of the adhesive film (unit: mm)−initial length (unit: mm) of the adhesive film). And the initial thickness of the adhesive film (unit: μm) is a thickness of the adhesive film before preparation of the specimen. The value was calculated by Equation 1 using the stretched length of adhesive film (unit: μm) and the initial thickness of adhesive film (unit: μm).

(Stretched length of adhesive film)/(Initial thickness of adhesive film)×100     <Equation 1>

(3) Peel strength: An adhesive film having a size of 100 mm×25 mm×100 μm (length×width×thickness) was obtained by releasing the PET film from each of the adhesive sheets prepared in Examples and Comparative Examples. One surface of the PET film having a size of 150 mm×25 mm×75 μm (length×width×thickness) was subjected to corona treatment twice (total dose: 156) under plasma discharge at 78 dose using a corona treatment device. The corona-treated surfaces of the PET films were stacked on both surfaces of the adhesive film, thereby preparing a specimen, as shown in FIG. 3 (a). The specimen was autoclaved under conditions of 3.5 bar and 50° C. for about 1,000 seconds and secured to a TA.XT_Plus texture analyzer (Stable Micro System Co., Ltd.). Referring to FIG. 3 (b), with each of the PET films secured at one side thereof to the TA.XT_Plus Texture Analyzer at 25° C., T-peel strength was measured by pulling the other side of each of the PET films at 50 mm/min.

(4) Flexural reliability: An adhesive film (thickness: 100 μm) and a PET film (thickness: 50 μm) were stacked in above order to have a bilayer structure, attached to one another using a roller, left at room temperature for 12 hours, and cut into a specimen having a size of 70 mm×140 mm. Then, the specimen was secured to a flexibility evaluation tester (CFT-200, Covotech Co., Ltd.) using an adhesive (4965, Tesa Co., Ltd.). Here, the PET film was subjected to corona treatment and attached to the adhesive film such that the corona-treated surface of the PET film was attached to the adhesive film. The specimen was subjected to bending in the longitudinal direction of the specimen and in the direction of the adhesive film under conditions of −20° C./60° C. and 93% RH at a bending rate of 30 cycles per minute such that a bent portion of the specimen had a radius of curvature of 3 mm (1 cycle refers to an operation of bending the adhesive film to have the radius of curvature, followed by unfolding the adhesive film back to an original state thereof). The number of bending cycles was recorded until the specimen is delaminated or bubbles are generated in the specimen. The adhesive film allowing 100,000 cycles of bending or more has good reliability and can be applied to a flexible display.

TABLE 1

|  | Example | | | | | Comparative Example | | | Reference Example |
| --- | --- | --- | --- | --- | --- | --- | --- | --- | --- |
|  | 1 | 2 | 3 | 4 | 5 | 1 | 2 | 3 | 1 |
| 2-EHA (parts by weight) | 60 | 60 | 55 | 50 | 40 | 0 | 0 | 80 | 60 |
| AM90G (parts by weight) | 20 | 20 | 20 | 30 | 0 | 80 | 0 | 0 | 20 |
| EHDG-AT (parts by weight) | 0 | 0 | 0 | 0 | 40 | 0 | 80 | 0 | 0 |
| 2-HEA (parts by weight) | 0 | 0 | 0 | 0 | 0 | 20 | 20 | 20 | 0 |
| 2-HBA (parts by weight) | 20 | 20 | 25 | 20 | 20 | 0 | 0 | 0 | 20 |
| Organic nanoparticles (parts by weight) | 1 | 0 | 1 | 1 | 1 | 0 | 0 | 0 | 0 |
| Initiator Irgacure 651 (parts by weight) | 0.3 | 0.3 | 0.3 | 0.3 | 0.3 | 0.3 | 0.3 | 0.3 | 0.3 |

TABLE 1-continued

|  | Example | | | | | Comparative Example | | | Reference Example |
|---|---|---|---|---|---|---|---|---|---|
|  | 1 | 2 | 3 | 4 | 5 | 1 | 2 | 3 | 1 |
| Crosslinking agent, SR610 (parts by weight) | 0.05 | 0.1 | 0 | 0.1 | 0 | 0.1 | 0.1 | 0 | 0 |
| Crosslinking agent, HDDA (parts by weight) | 0 | 0 | 0 | 0 | 0 | 0 | 0 | 0 | 0.1 |
| Modulus −20° C. (kPa) | 51 | 53 | 56 | 49 | 55 | 40 | 45 | 103 | 69 |
| 25° C. | 22 | 23 | 24 | 24 | 24 | 12 | 15 | 35 | 29 |
| 80° C. | 17 | 17 | 16 | 18 | 18 | 5 | 9 | 24 | 25 |
| Value of Equation 1 (%) | 58 | 59 | 63 | 58 | 49 | 500 or more | 500 or more | 56 | 37 |
| Peel strength (gf/inch) | 1,178 | 1,110 | 1,277 | 1,003 | 1,190 | 211 | 386 | 1670 | 878 |
| Flexural reliability at −20° C. | 100,000 or more | 100,000 or more | 100,000 or more | 100,000 or more | 100,000 or more | 10,000 or less | 10,000 or less | 10,000 or less | 50,000 |
| Flexural reliability at 60° C. and 93% RH | 100,000 or more | 100,000 or more | 100,000 or more | 100,000 or more | 100,000 or more | 10,000 or less | 10,000 or less | 80,000 | 100,000 or more |

*2-EHA: 2-ethylhexylacrylate (LG Chemical Co. Ltd., homopolymer Tg: −50° C.)
*AM90G: Methoxypolyethylene glycol 400 acrylate (EO 9 mol, Shin Nakamura Chemical Co. Ltd., homopolymer Tg: −71° C.)
*EHDG-AT: 2-ethylhexyl diethylene glycol acrylate (EO 2 mol, Kyoeisha Chemical Co. Ltd. homopolymer Tg: −62° C.)
*2-HEA: 2-hydroxy ethylacrylate (homopolymer Tg: −15° C.)
*2-HBA: 2-hydroxy butylacrylate (homopolymer Tg: −40° C.)
*SR610: polyethylene glycol (600) diacrylate (Sartomer Co. Ltd., homopolymer Tg: −40° C.)
*HDDA: 1,6-hexanediol diacrylate (Sk Cytec Co. Ltd., homopolymer Tg: 43° C.)

As shown in Table 1, the adhesive films of Examples had good properties in terms of foldability in the compression direction, flexibility at low temperature, flexural reliability at low temperature and under high temperature/humidity conditions, and peel strength.

Conversely, the adhesive films of Comparative Examples 1 to 3, which did not satisfy the modulus and the value of Equation 1 of the present invention, exhibited negative foldability or reliability.

The adhesive film of Reference Example 1, which included an HDDA initiator, suffered from deterioration in peel strength and flexural reliability at low temperature due to increase in modulus at low temperature.

It should be understood that various modifications, changes, alterations, and equivalent embodiments can be made by those skilled in the art without departing from the spirit and scope of the invention.

The invention claimed is:

1. An adhesive film formed of an adhesive composition comprising: a monomer mixture comprising an alkyl group-containing acrylate and a hydroxyl group-containing acrylate; and an initiator, the adhesive film having a modulus of 80 kPa or less at −20° C. and a value of 40% to 140% at 25° C., as calculated by Equation 1:

(Stretched length of adhesive film)/(Initial thickness of adhesive film)×100, wherein the stretched length of the adhesive film (unit: μm) is measured on a specimen, the specimen being prepared by attaching one end of a first polyimide film (length×width×thickness, 45 mm×15 mm×50 μm) to one end of a second polyimide film (length×width×thickness, 45 mm×15 mm×50 μm) via the adhesive film (length×width×thickness, 15 mm×15 mm×50 μm) in a structure of one end of the first polyimide film/adhesive film/one end of the second polyimide film to have a stepped cross-sectional shape , and the stretched length of the adhesive film is obtained by subtracting an initial length (unit: mm) of the adhesive film from a final length of the adhesive film (unit: mm) (final length of the adhesive film (unit: mm)−initial length (unit: mm) of the adhesive film) and converting to unit of micrometers when the other end of the second polyimide film is pulled at 0.6 mm/min under a load of 500 gf at 25° C. for 10 minutes, with the other end of the first polyimide film of the specimen secured to a tester; and the initial thickness of the adhesive film (unit: μm) is a thickness of the adhesive film before preparation of the specimen, wherein the alkyl group-containing acrylate comprises a mixture of a first alkyl group-containing acrylate and a second alkyl group-containing acrylate, the first alkyl group-containing acrylate being a non-alkylene glycol-based acrylate having a glass transition temperature of −20° C. to −55° C. in a homopolymer phase and free from an alkylene glycol group, and the second alkyl group-containing acrylate being an alkylene glycol-based acrylate having a glass transition temperature of −55° C. to −90° C. in a homopolymer phase and containing an alkylene glycol group.

2. The adhesive film according to claim 1, wherein the adhesive film has a ratio of modulus at 80° C. to modulus at −20° C. of 1:1 to 1:10.

3. The adhesive film according to claim 1, wherein the adhesive film has a modulus of 10 kPa to 200 kPa at 80° C.

4. The adhesive film according to claim 1, wherein the adhesive film has a peel strength of 700 gf/in or more at 25° C.

5. The adhesive film according to claim 1, wherein the first alkyl group-containing acrylate comprises at least one of 2-ethylhexyl acrylate, n-butyl acrylate, and iso-octyl acrylate.

6. The adhesive film according to claim 1, wherein the second alkyl group-containing acrylate comprises at least one of methoxypolyethylene glycol acrylate and ethylhexyldiethylene glycol acrylate.

7. The adhesive film according to claim 1, wherein the hydroxyl group-containing acrylate has a glass transition temperature of 0° C. to −40° C. in a homopolymer phase.

8. The adhesive film according to claim 1, wherein the monomer mixture comprises 10 wt % to 40 wt % of the hydroxyl group-containing acrylate and 60 wt % to 90 wt % of the alkyl group-containing acrylate.

9. The adhesive film according to claim 1, wherein the adhesive composition further comprises organic nanoparticles, the organic nanoparticles having an average particle diameter of 10 nm to 400 nm.

10. The adhesive film according to claim 9, wherein the organic nanoparticles have a core-shell structure, the core and the shell satisfying Equation 2:

$$Tg(c)<Tg(s) \qquad \text{<Equation 2>}$$

wherein Tg(c) is a glass transition temperature (unit: ° C.) of the core and Tg(s) is a glass transition temperature (unit: ° C.) of the shell.

11. The adhesive film according to claim 9, wherein the organic nanoparticles are present in an amount of 0.1 parts by weight to 20 parts by weight relative to 100 parts by weight of the hydroxyl group-containing acrylate and the alkyl group-containing acrylate.

12. The adhesive film according to claim 1, wherein the adhesive composition further comprises a crosslinking agent having a glass transition temperature of 40° C. to −60° C. in a homopolymer phase.

13. The adhesive film according to claim 12, wherein the crosslinking agent comprises polyethylene glycol diacrylate.

14. An optical member comprising an optical film and an adhesive film formed on at least one surface of the optical film,
wherein the adhesive film comprises the adhesive film according to claim 1.

15. The optical member according to claim 14, wherein the optical member is a three-layer film laminate comprising a first optical film, a second optical film, and the adhesive film interposed between the first optical film and the second optical film to attach the first optical film to the second optical film.

16. The optical member according to claim 15, wherein each of the first optical film and the second optical film is formed of at least one resin selected from among a polyester resin, a polycarbonate resin, a polyimide resin, a polyacrylate resin, a cyclic olefin polymer resin, and an acrylic resin.

17. The optical member according to claim 15, wherein each of the first optical film and the second optical film has a thickness of 10 μm to 100 μm and the adhesive film has a thickness of 10 μm to 100 μm.

18. A window film comprising: the optical member according to claim 14; and a window coating layer formed on the optical member.

19. An optical display comprising the optical member according to claim 14.

* * * * *